(12) United States Patent
Menelaou

(10) Patent No.: US 6,412,717 B1
(45) Date of Patent: Jul. 2, 2002

(54) GRATER

(76) Inventor: Xanthos Menelaou, 115 Sydney Road, Muswell Hill, London (GB), N10 2ND ( * ) Notice: Subject to any disclaimer, the term of this patent is extended or adjusted under 35 U.S.C. 154(b) by 0 days.

(21) Appl. No.: 09/540,227

(22) Filed: Mar. 31, 2000

Related U.S. Application Data

(63) Continuation of application No. PCT/GB98/02911, filed on Sep. 28, 1998.

(30) Foreign Application Priority Data

| Oct. 2, 1997 | (GB) | 9720978 |
| Apr. 25, 1998 | (GB) | 9808738 |

(51) Int. Cl.$^7$ ............................................... A47J 42/04
(52) U.S. Cl. ................ 241/92; 241/169.1; 241/273.1
(58) Field of Search ......................... 241/92, 169.1, 241/273.1

(56) References Cited

U.S. PATENT DOCUMENTS

| 1,025,213 A | * | 5/1912 | Craven |
| 2,700,995 A | * | 2/1955 | Ritter |
| 2,751,118 A | | 6/1956 | Soule ........................... 222/80 |
| 2,842,176 A | | 7/1958 | Bowland ..................... 146/192 |
| 2,867,255 A | | 1/1959 | Berney et al. ................. 146/61 |
| 2,917,765 A | * | 12/1959 | Jakubowski |
| 3,464,469 A | * | 9/1969 | Belz |
| 3,581,790 A | * | 6/1971 | Del Conte |
| 4,127,375 A | | 11/1978 | Nelson ......................... 425/313 |
| 4,885,822 A | | 12/1989 | Corrie et al. .................. 17/39 |
| 5,180,114 A | * | 1/1993 | Chen |
| 5,626,299 A | * | 5/1997 | Haynes |
| 5,967,434 A | * | 10/1999 | Virk |

FOREIGN PATENT DOCUMENTS

| FR | 771391 | 10/1934 |
| FR | 2000231 | 9/1969 |
| FR | 2542184 | 9/1984 |
| GB | 245367 | 1/1926 |
| GB | 704503 | 2/1954 |
| GB | 1161257 | 8/1969 |
| GB | 1451217 | 9/1976 |
| GB | 2293754 | 4/1996 |

* cited by examiner

Primary Examiner—Allen Ostrager
Assistant Examiner—William Hong
(74) Attorney, Agent, or Firm—Price, Heneveld, Cooper, DeWitt & Litton

(57) ABSTRACT

A grater for grating food comprising a container for housing food to be grated, the container having an inner surface with a non-circular cross-section, the inner surface inhibiting rotation of food to be held in the container, and a substantially circular grating portion for grating food held in the container, the arrangement being such that the extremities of the noncircular inner surface lie on the periphery of the circular grating portion, the circular grating portion being adapted to rotate relative to the container.

9 Claims, 9 Drawing Sheets

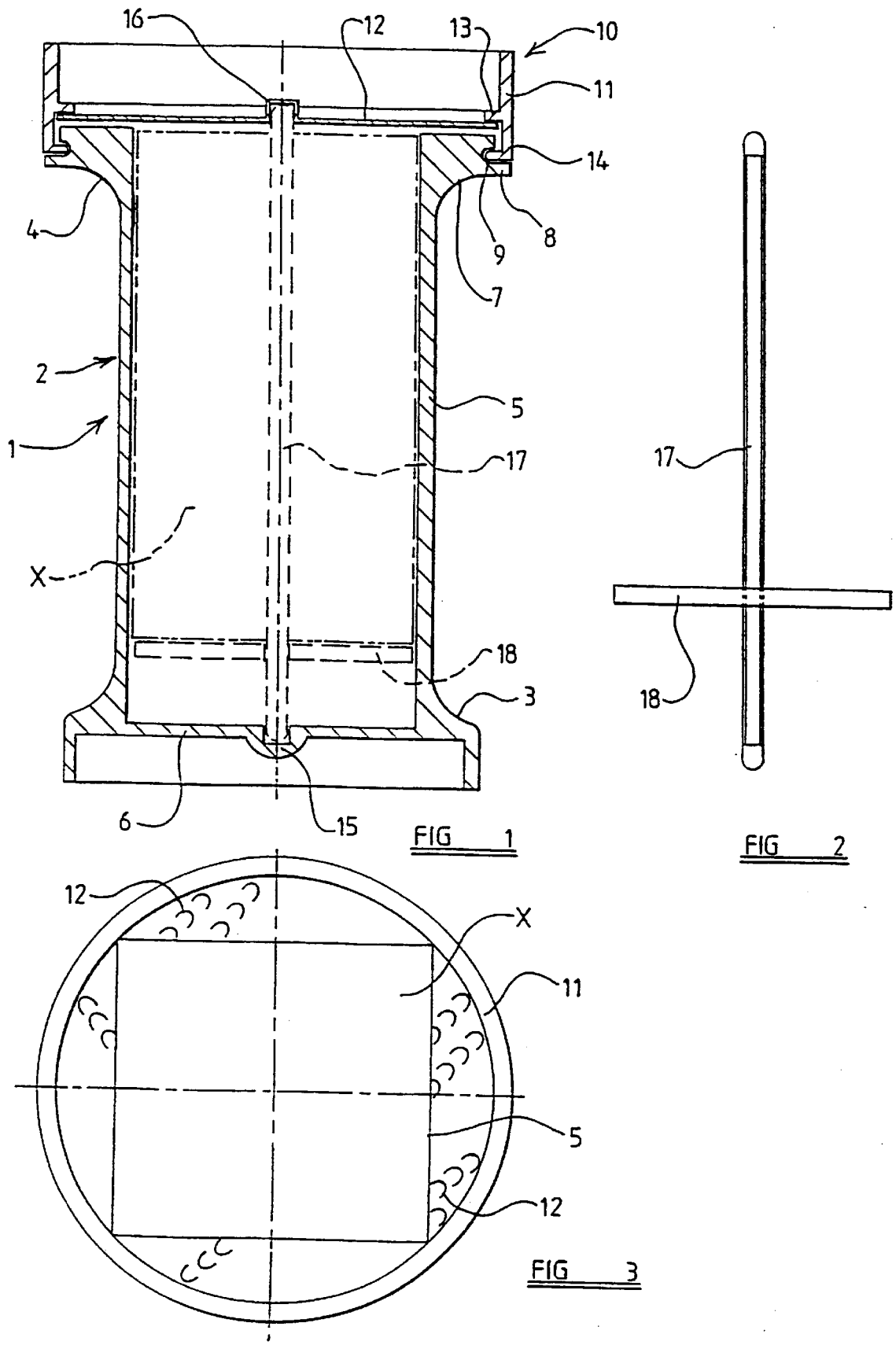

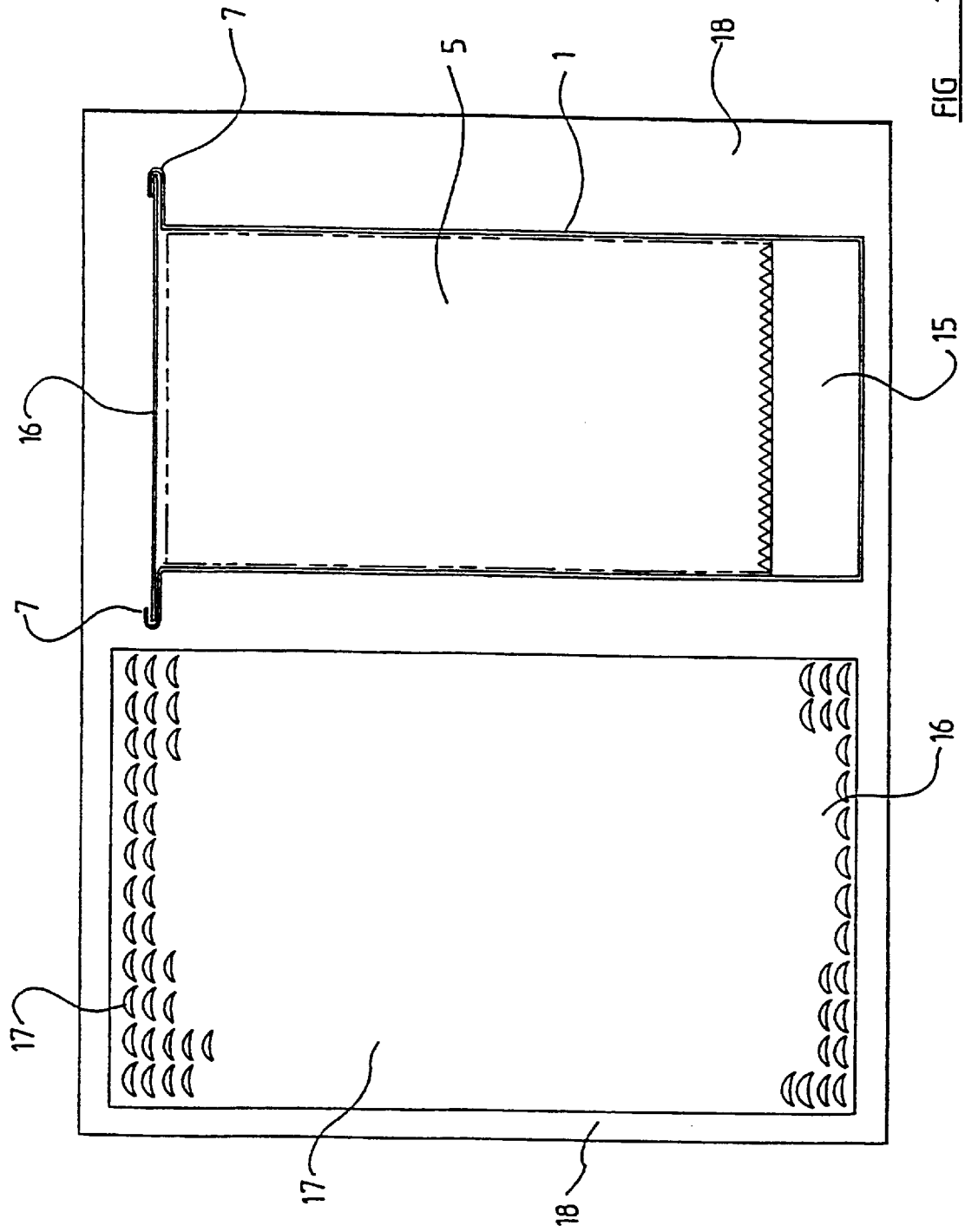

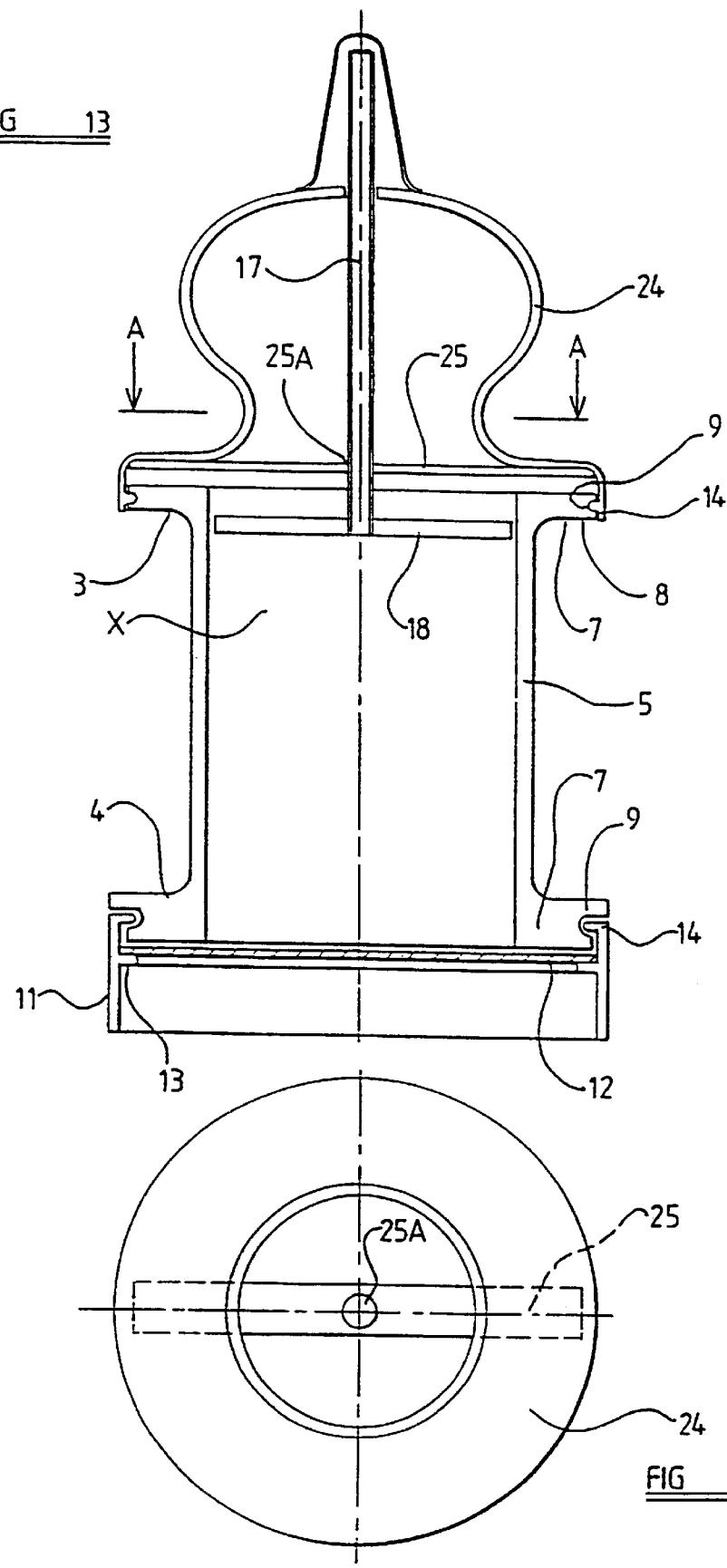

GRATER

RELATED APPLICATIONS

This application is a continuation under 35 U.S.C. §120 of International PCT application No. PCT/GB98/02911, filed Sep. 28, 1998, which claims the benefit of British Application No. 9720987.8 filed Oct. 2, 1997 and British Application No. 9808738.0 filed Apr. 25, 1998, the disclosures of each of these applications are incorporated herein by reference.

BACKGROUND OF THE INVENTION

This invention relates to a grater and more particularly to a grater for grating food.

Graters for grating food are well known. Examples of food graters, such as cheese graters and the like, are disclosed in GB 704,503, GB 245,367, GB 1,161,257 and GB 2,293,754. These graters are not entirely satisfactory since their design is overly complicated and expensive to manufacture. Accordingly, it is an object of the present invention to seek to provide a simple and cheap way to manufacture a food grater.

SUMMARY OF THE INVENTION

Accordingly, one aspect of the present invention provides a grater for grating food comprising a container for housing food to be grated, the container having an inner surface with a non-circular cross-section, the inner surface inhibiting rotation of the food to be held in the container, and a substantially circular grating portion for grating food held in the container, the arrangement being such that the extremities of the non-circular inner surface lie on the periphery of the circular grating portion, the circular grating portion being adapted to rotate relative to the container.

It is particularly advantageous to provide a disposable food grater or a disposable container for a food grater. Accordingly, another aspect of the present invention provides a disposable food container for use with a food grater embodying the present invention.

These and other features, advantages and objects of the present invention will be further understood and appreciated by those skilled in the art by reference to the following specification, claims and appended drawings.

BRIEF DESCRIPTION OF THE DRAWINGS

In order that the present invention may be more readily understood, embodiments thereof will now be described, by way of example, with reference to the accompanying drawings, in which:

FIG. 1 is a cross-section through a food grater embodying the present invention, parts thereof being shown in phantom;

FIG. 2 is a side view of a part for the food grater of FIG. 1;

FIG. 3 is a schematic view from above showing a container body of the grater and a grating portion;

FIG. 12 is a side view of a package enclosing a food grater embodying the present invention and a grating portion;

FIG. 13 is a cross-section of a food grater embodying the present invention;

FIG. 14 is a cross-section of the food grater of FIG. 13 taken along the line A–A;

DETAILED DESCRIPTION OF THE PREFERRED EMBODIMENT

Figure 5:
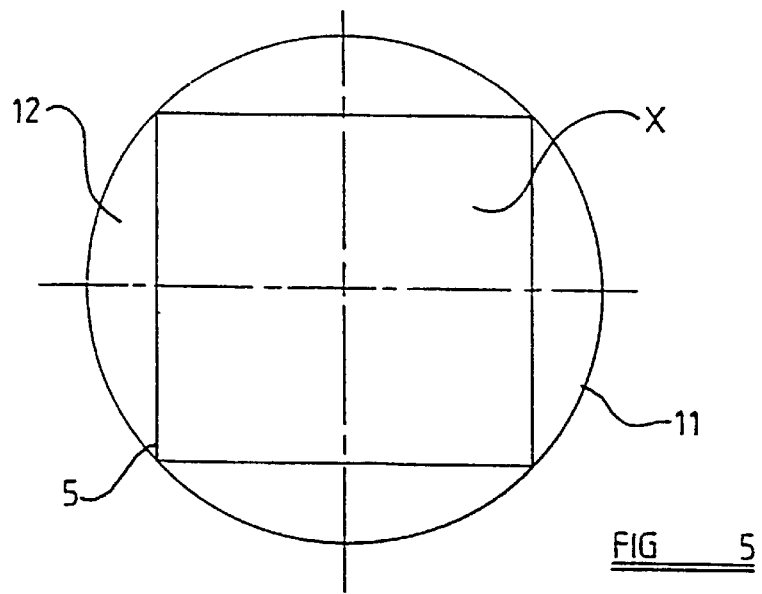
FIG. 5 is a schematic view from above showing a container body of the grater of FIG. 4 and the grating portion.

Referring to FIGS. 1 through 3, a food grater embodying the present invention is illustrated. The food grater 1 comprises an elongate body portion 2 which is hollow and has a substantially square internal cross-section. One end 3 of the body portion 2 is closed and the other end 4 of the body portion 2 is open. The body portion 2 thereby defines a container 5. The container 5 has a base 6 which comprises the closed end 3. Preferably, the container 5 is manufactured as a one-piece structure from a single material, preferably a plastics or an acrylic material.

The open end 4 of the container 5 has an outwardly extending portion which defines an annular flange 7. The flange 7 has a circular periphery which has an outwardly facing edge 8 in which is provided an annular channel 9.

A grating portion 10 is shown attached to the container 5. The grating portion 10 comprises a cylindrical collar 11 supporting a circular metallic cutting or grating surface 12. Preferably, the inner surface of the collar 11 is provided with a small inwardly facing projection 13 upon which the circular grating surface 12 can rest and be secured by an adhesive or the like. The collar 11 is provided with an inwardly facing annular lip 14 which is adapted to engage with the annular channel 9 on the outwardly facing edge 8 of the flange 7. Thus, the grating portion 10 is rotatably mounted on the annular flange 7 of the container 5.

A central indent 15 is provided in the base 6 and a corresponding indent 16 is provided in the center of the grating surface 12. A threaded spindle 17 is held at either end by one of the indents 15, 16. The spindle 17 is prevented from rotating with respect to the grating portion 10 by the indent 16 but is allowed to rotate with respect to the container 5 by the indent 15. A pressure plate 18 having substantially the same cross-section as the interior surface of the container 5 is provided with a threaded aperture at its center. The spindle 17 is threaded onto the pressure plate 18 such that rotation of the pressure plate 18 around the spindle 17 moves the pressure plate along the spindle 17. In the example shown in FIGS. 1 and 2, rotation of the container 5 in a clockwise direction with respect to the collar 11 would result in the pressure plate 18 being moved towards the collar 11 and away from the base 6.

Preferably, the spindle 17 is reversible such that once the food X in the container 5 has been grated and needs to be replaced, the collar 11 is detached from the container 5, the spindle is removed from the container, turned through 180 degrees, reinserted in the container, a new supply of food X added and the collar 11 reattached to the container. The grater is then ready for use.

FIG. 3 shows an extremely important aspect of the present invention. When viewed from above in the schematic representation of FIG. 3, the inner surface of the container 5 has a substantially square cross section. The circular grating surface 12 has a periphery which is bounded by the collar 11. This periphery or circumference of the grating surface 12 is inscribed by the four corners of the inner surface of the container 5. Thus, it can be appreciated that rotation of the container 5 with respect to the collar 11 results in a grating action which cuts all parts of the food X held in the container 5.

The arrangement can be generalized by stating that it is the requirement of the present invention for the extremities of the shape defining the inner surface of the container body to be inscribed on (that is to say lying on) the periphery of the grating surface 12. This simple arrangement provides a food grater design which is simple and cheap to manufacture and ensure that the entire area of food X presented by the inner surface of the container 5 is grated by the grating surface 12. This is an arrangement which has not heretofore been appreciated.

Figure 4:
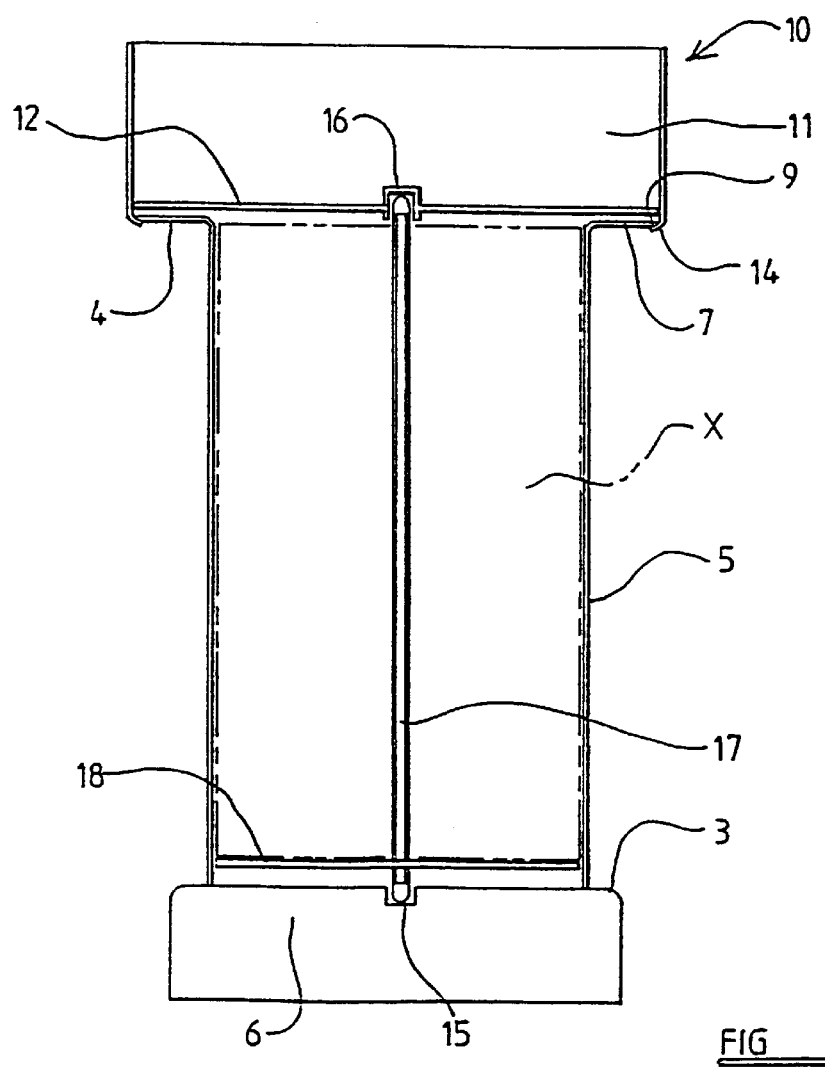
FIG. 4 is a cross-section of a food grater according to another embodiment of the present invention.

FIG. 4 shows a food grater embodying the present invention. The same reference numerals as used in FIGS. 1 to 3 are used in FIG. 4 to denote the same or similar elements. This food grater is a simplified version of the design shown in FIG. 1. Instead of providing an annular channel on the container and a cooperating annular rim on the collar 11, the container 5 is provided with a simple circular flange 7 projecting from the container 5. Similarly, the collar 11 is provided with an inwardly facing lip which snaps over the circular flange 7 to rotatably mount the collar 11 on the container 5. In contrast to the grater of FIG. 1, the grater of FIG. 4 has a container 5 which is made out of thinner material than the grater of FIG. 1. The container 5 is therefore collapsible such that when the food in the container has been exhausted, the grater can be collapsed and disposed. FIG. 5 shows the same arrangement as shown in FIG. 3 in which the four corners of the interior surface of the container 5 are inscribed on the periphery of the grating surface 12.

Figure 6:
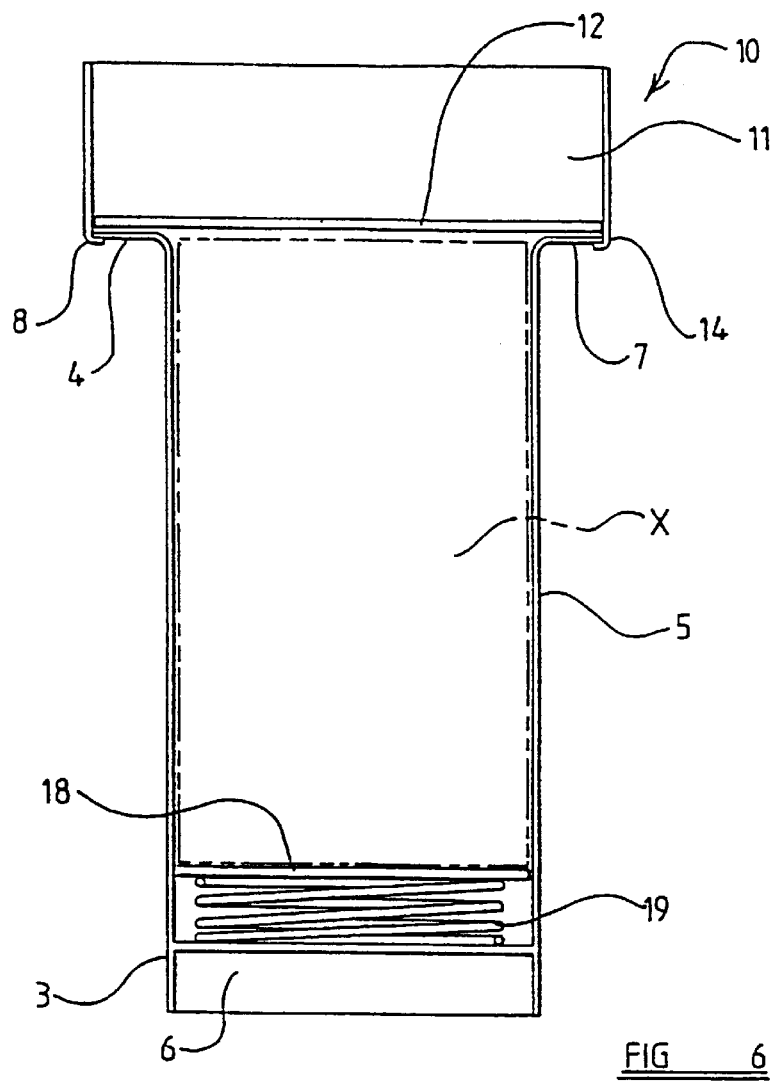
FIG. 6 is a cross-section of a food grater according to a further embodiment of the present invention.
Figure 7:
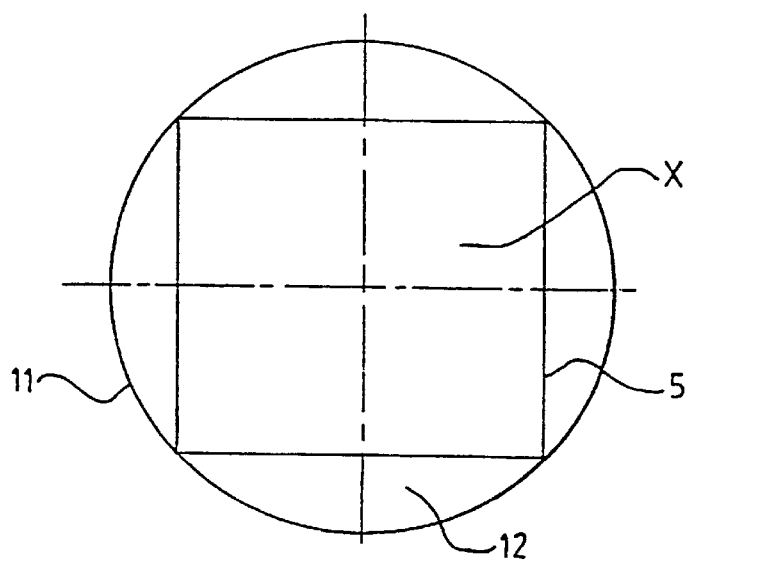
FIG. 7 is a schematic view from above showing a container body of the grater of FIG. 6 and the grating portion.

FIG. 6 shows another embodiment of the present invention in which the spindle 17 is replaced by a compression spring 19 mounted between the base 6 of the container 5 and the pressure plate 18. Food X located between the pressure plate 18 and the grating surface 12 is biased towards the grating surface such that when the collar 11 is rotated with respect to the container 5, the food X is grated through the grating surface. The manner in which the collar 11 is rotatably mounted and fixed onto the container 5 is identical to that showed in FIG. 4. In addition, it will be appreciated from FIG. 7 that the corners or extremities of the inner surface of the container 5 are inscribed on the periphery of the cutting surface 12.

Figure 8:
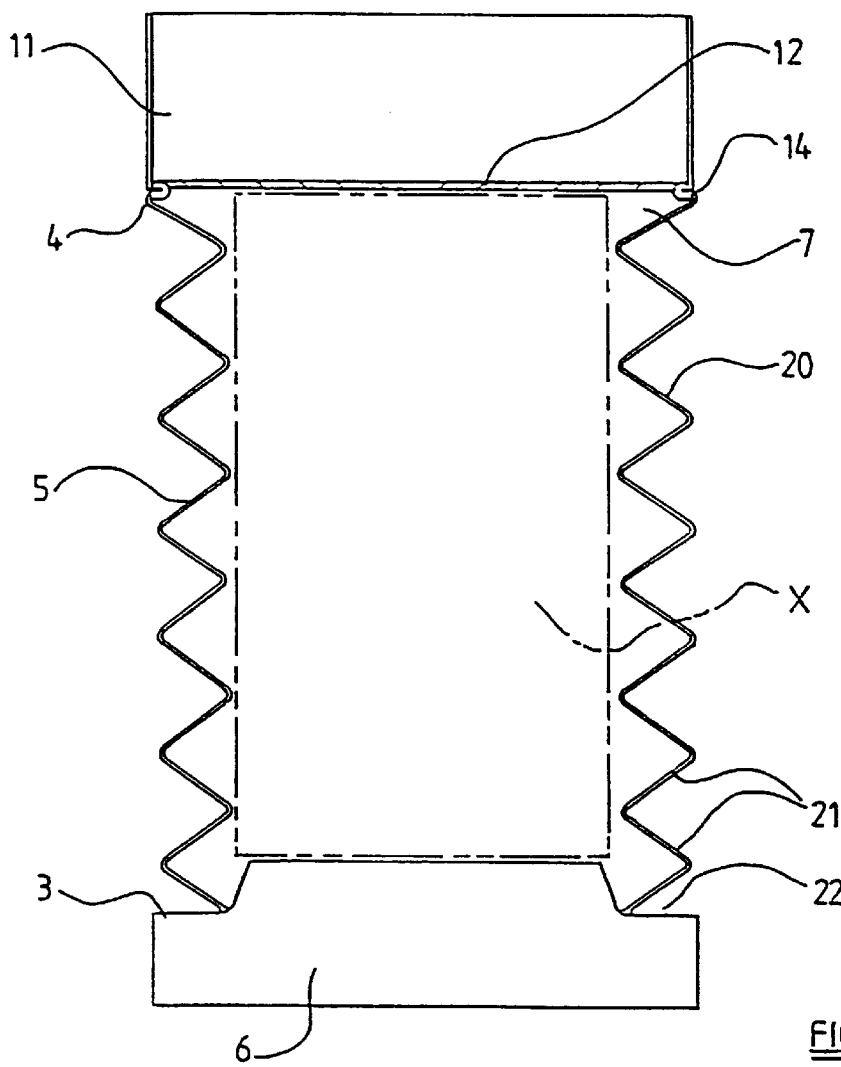
FIG. 8 is a cross-section of a food grater according to yet another embodiment of the present invention.

The embodiment of the food grater shown in FIG. 8 does not require a spindle 17 or a compression spring 19 that uses a bellow-like collapsible frame 20. Preferably, this embodiment is a disposable food grater in which the mechanical pressure required to force the food X inside the container 5 onto the grating surface 12 whilst turning the collar 11 with respect to the container 5 is exerted by hand. As the collapsible frame 20 concertinas and folds in on itself, the folds 21 gather at the base 6 of the container 5 in an area specially provided for this purpose. Thus, as can be seen from FIG. 8, the base 6 is provided with a step 22 to accommodate the folds 21 of the collapsible frame 20.

Figure 9:
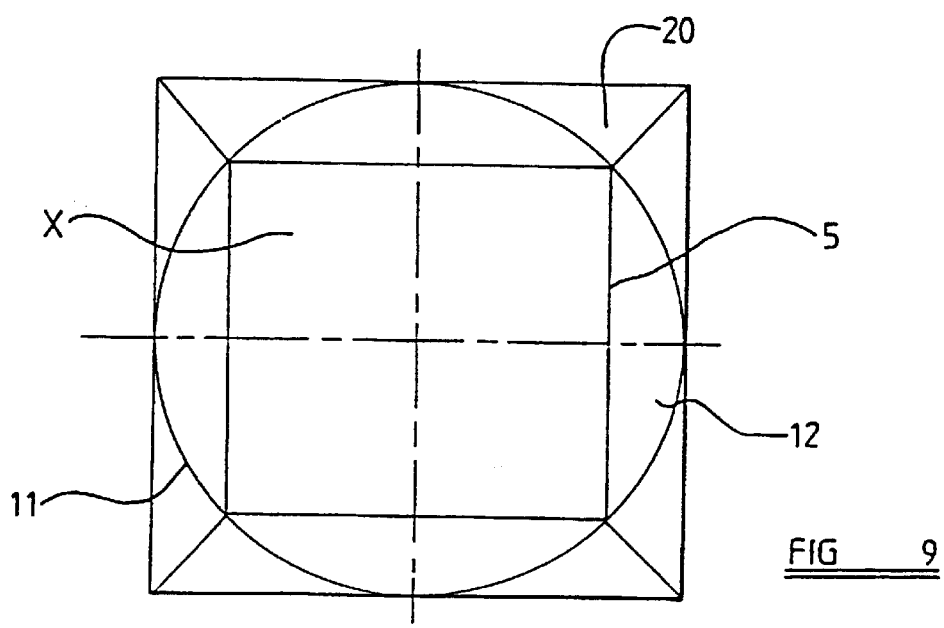
FIG. 9 is a schematic view from above showing a container body of the grater of FIG. 8 and the grating portion.

Referring to FIG. 9, the inner surface defined by the folds of the collapsible frame 20 have four corners which are inscribed on the periphery of the grating surface 12.

Figure 10:
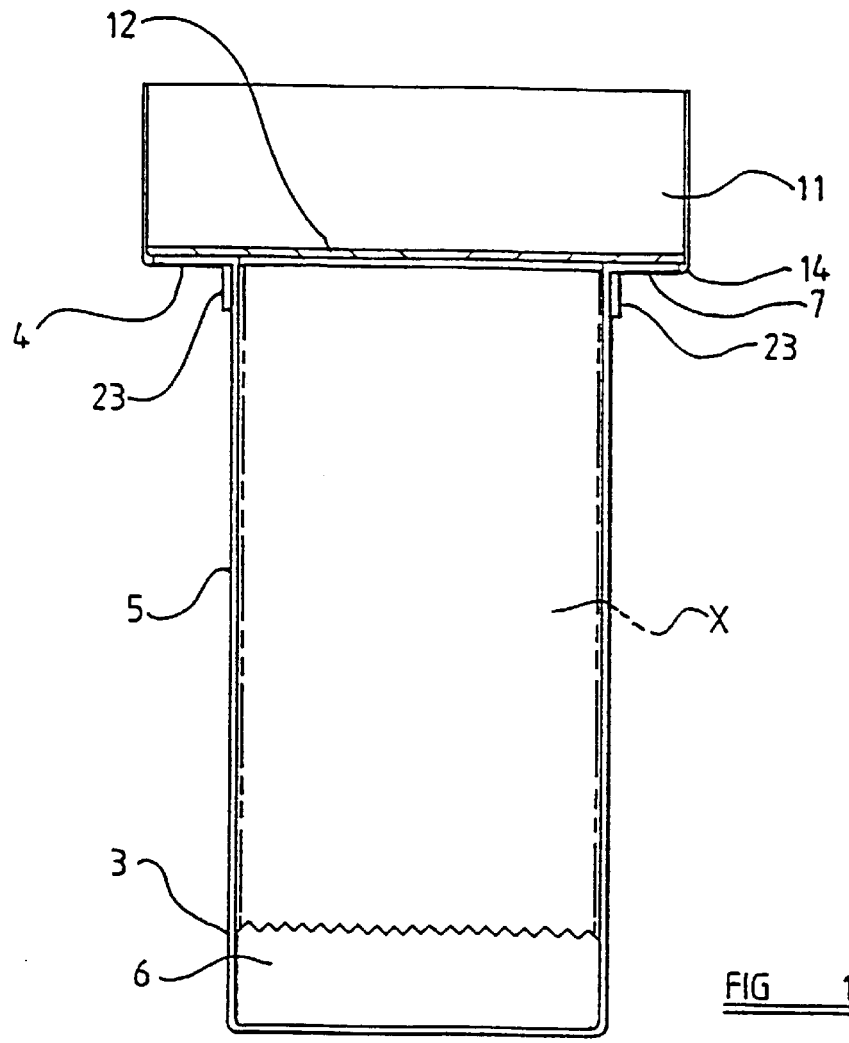
FIG. 10 is a cross-section of a food grater according to a further embodiment of the present invention.
Figure 11:
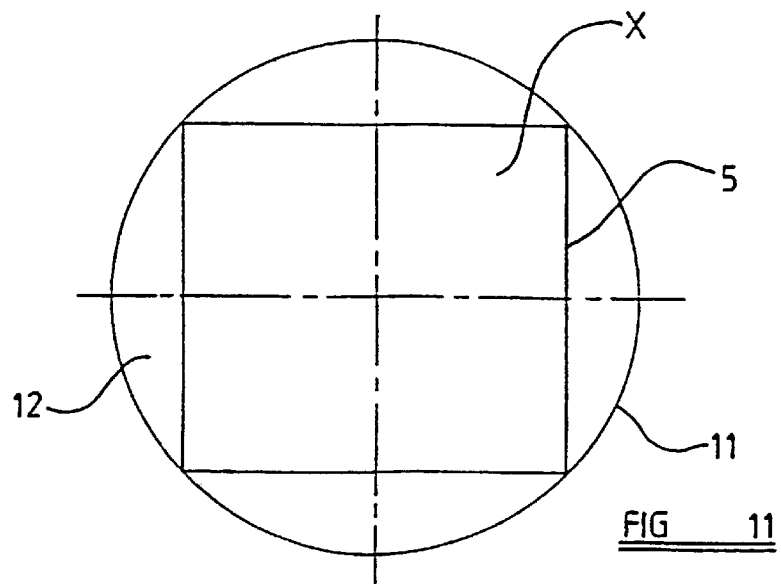
FIG. 11 is a schematic view from above showing a container body of the grater of FIG. 10 and the grating portion.

FIG. 10 shows an example of a food grater embodying the present invention in which the mechanical means required to exert pressure on the food X and force the food X into contact with the grating surface 12 is entirely manual, the walls of the container 5 being made of a flexible and readily hand-collapsible material such as polyethylene. Preferably, the base 6 is substantially solid. In order to maintain some structural stability in the region where the food X makes contact with the grating surface 12, a food support is provided which comprises four side walls 23, the corners of which are inscribed on the periphery of the grating surface 12 as shown in FIG. 11. The side walls 23 provide structural support to the collapsible material of the container body in the region of the grating surface 12 to ensure that the food X in the container 5 is properly presented to the grating surface 12. This example of a grater embodying the present invention is especially suited to use as a disposable food grater given its cheap and simple construction and design.

The disposable food graters such as those shown in FIGS. 6, 8 and 10 may be provided ready packaged. As shown in FIG. 12, the packaging could enclose the food X inside the container 5. Such disposable food graters can be used with a planar rectangular grating portion 16 which can be held by a flange having two parallel rails such that the rectangular grating portion 16 can slide backwards and forwards over the food in the container, guided by the rails.

FIG. 13 shows a food grater embodying the present invention which is provided with a rotatable lid 24 in addition to the collar 11 which is also rotatably mounted with respect to the container 5. Rather than mounting the spindle 17 between a base 6 and the grating surface 12, the spindle 17 is mounted in the lid 24 and through a bar 25 having a threaded aperture 25A, the bar 25 straddling the closed end 3 of the container 5. The pressure plate 18 is rotatably mounted on the end of the spindle 17 so that it can freely rotate with respect to the spindle. Thus, rotation of the lid 24 with respect to the collar 11 causes the threaded spindle 17 to move down through the lid pushing the pressure plate 18 towards the grating surface 12. The lid 24 can be removed from the container 5 so that the food X can be inserted in the container 5 for subsequent grating.

Figure 15:
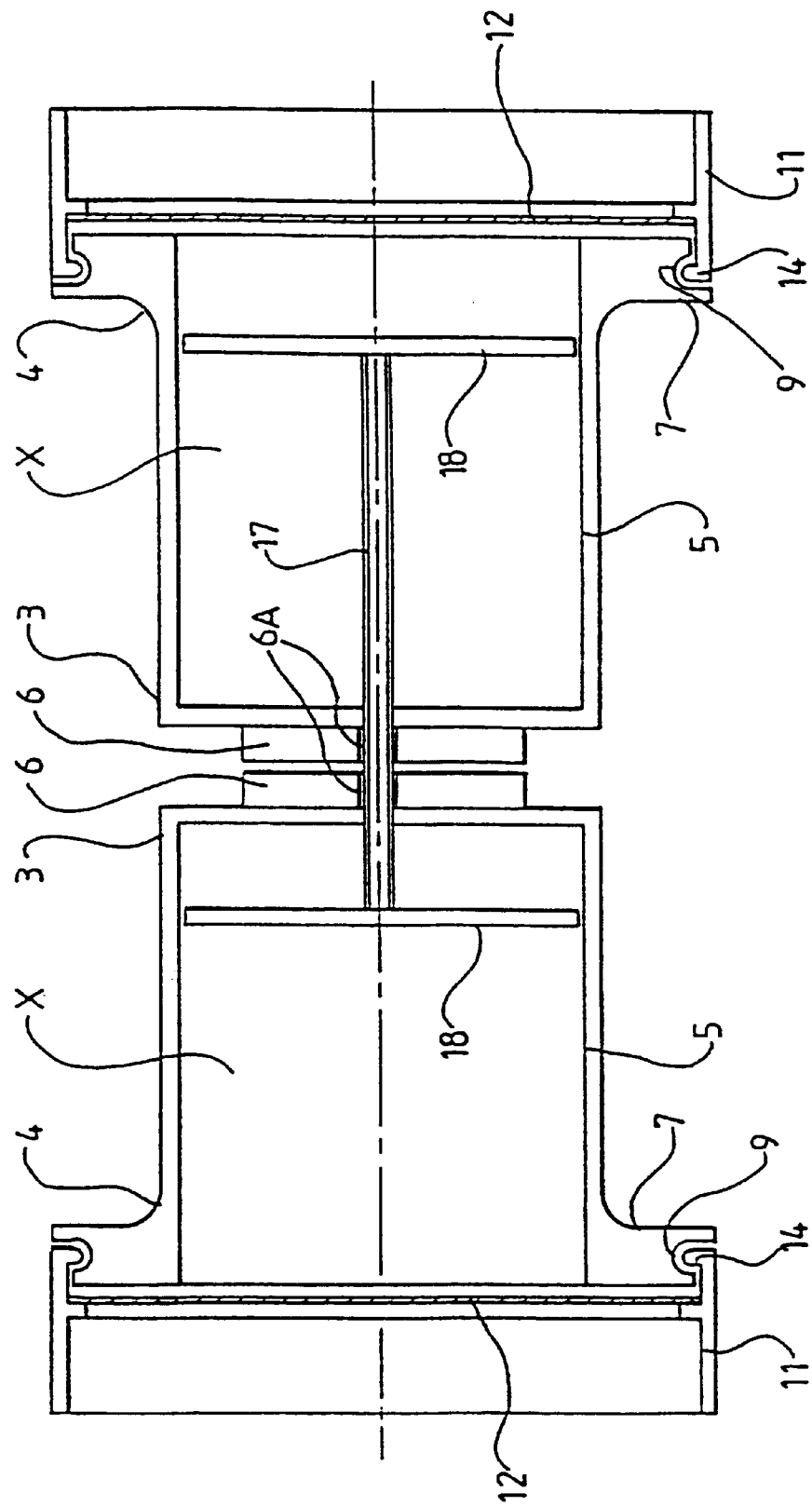
FIG. 15 is a cross-section of a food grater according to another embodiment of the present invention.

FIG. 15 discloses another embodiment of the present invention. In this embodiment, twin containers 5 abut one another, base 6 to base 6, a single spindle 17 running through threaded apertures 6A in the bases 6 of the two containers 5. A pressure plate 18 is provided at each end of the spindle 17. When the containers are rotated in one direction with respect to one another, one of the pressure plates 18 is pushed towards its respective grating surface 12 whilst the other pressure plate 18 is moved away from its respective grating surface 12. If the relative direction of rotation of the two containers is reversed, then, likewise, the direction of travel of the spindle 17 is reversed pushing the other plate 18 towards its grating surface and moving the one plate 18 away from its grating surface 12. This example allows two types of food to be grated from opposite ends of the same grater.

Figure 16:
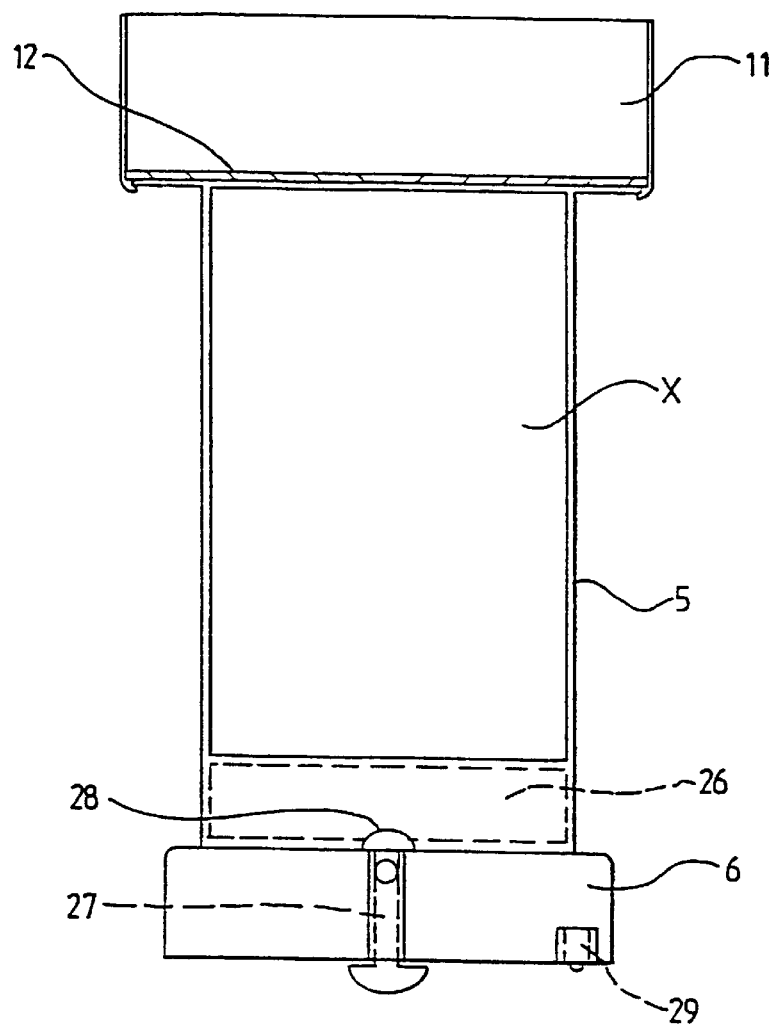
FIG. 16 is a cross-section of another food grater embodying the present invention.
Figure 17:
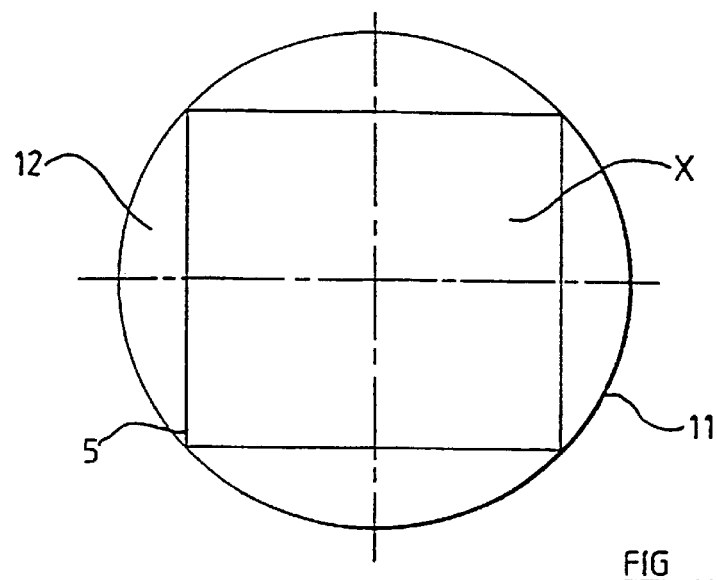
FIG. 17 is a schematic view from above showing a container body of the food grater FIG. 16 and the grating portion.

Referring now to FIG. 16, there is disclosed a grater in which the mechanical means to push the food X into contact with the grating surface 12 comprises an inflatable bag 26. The inflatable bag 26 is located between the food X in the container 5 and the base 6 of the container. The inflatable bag 26 is fed with gas from a pressurized gas compartment 27 through a valve 28 which is controlled by a button 29 mounted on the base 6. Thus, when more pressure is required, the button 29 is depressed and more gas is released into the inflatable bag 26.

It is to be appreciated that whilst the present examples of the invention have been described having an internal cross-section which is substantially square, other cross sections can be implemented. For example, in the broadest sense, the cross-section of the inner surface of the container 5 does not rotate when the grating surface 12 is rotated with respect to the container 5. Thus, the cross-section could be elliptical, ovoid or in a figure eight manner. Preferably, however, the non-circular cross section is polygonal and, most preferably, the cross-section is square or rectangular. It is important to ensure that the extremities of the noncircular cross sections of the inner surface of the container 5 are inscribed on, i.e., lie on, the periphery of the grating surface 12 in order to benefit from the improved design of the invention.

In accordance with one aspect of the invention, no additional elements are required in the container to prevent rotation of food in the container. This obviates the need to produce food blocks with special features such as indents to receive spines on the inner surface of a food container to prevent rotation. Additionally, it should be appreciated that, without the precise geometric relationship defined by the invention whereby the extremities of the noncircular inner surface of the container lie on the periphery of the circular grating portion, it would not be possible for the grater to benefit from the simplified designs described above.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A grater for grating food comprising:
a container for housing food to be grated, the container having first engagement means to releasably attach the container to a substantially circular grating portion for grating food held in the container and an inner surface with a non-circular cross-section, the inner surface inhibiting rotation of food to be held in the container, the grating portion also having second engagement means to cooperate with the first engagement means on the container; wherein extremities of the inner surface with the non-circular cross-section lie on a periphery of the circular grating portion and the first engagement means on the container and the circular grating portion cooperate with one another to allow rotation of the circular grating portion relative to the container, the grater further comprising mechanical means provided to exert pressure on food in the container to force food in the container into contact with the grating portion, the mechanical means comprising:
a threaded spindle releasably engaged at one end by the grating portion; and
a pressure plate, rotation of the grating portion with respect to the container causing movement of the pressure plate along the threaded spindle, the threaded spindle being reversible through 180° such that once food in the container has been exhausted, the spindle can be removed, replaced in the container in an opposite sense and the container reloaded with food to be ready for use;
wherein the container has a base having an indent arranged to receive the non-threaded, non-circular end of the threaded spindle not fixed to the grating portion, for free rotation of the spindle relative to the base.

2. A grater according to claim 1, wherein the container has an outer surface with a circular portion to which the grating portion is rotatably mounted.

3. A grater according to claim 1, wherein the first engagement means on the container comprises an outwardly extending portion which defines an annular flange, the flange having a circular periphery which has an outwardly facing edge defining an annular channel.

4. A grater according to claim 1, wherein the second engagement means on the grating portion comprises an inwardly facing annular lip.

5. A grater according to claim 1, wherein the non-circular cross-section is a polygonal cross-section.

6. A grater according to claim 5, wherein the non-circular cross-section is a regular polygonal cross-section.

7. A grater according to claim 6, wherein the non-circular cross-section is a square cross-section.

8. A grater according to claim 1, wherein the container comprises a one-piece structure.

9. A grater according to claim 1, wherein an indent is provided in the grating portion for engaging releasably non-threaded, non-circular ends of the spindle, for transferring rotation to it in accordance with its rotation.

* * * * *